May 21, 1935.     T. BROWN ET AL     2,002,002
TRACTOR
Filed Nov. 20, 1931     3 Sheets-Sheet 1
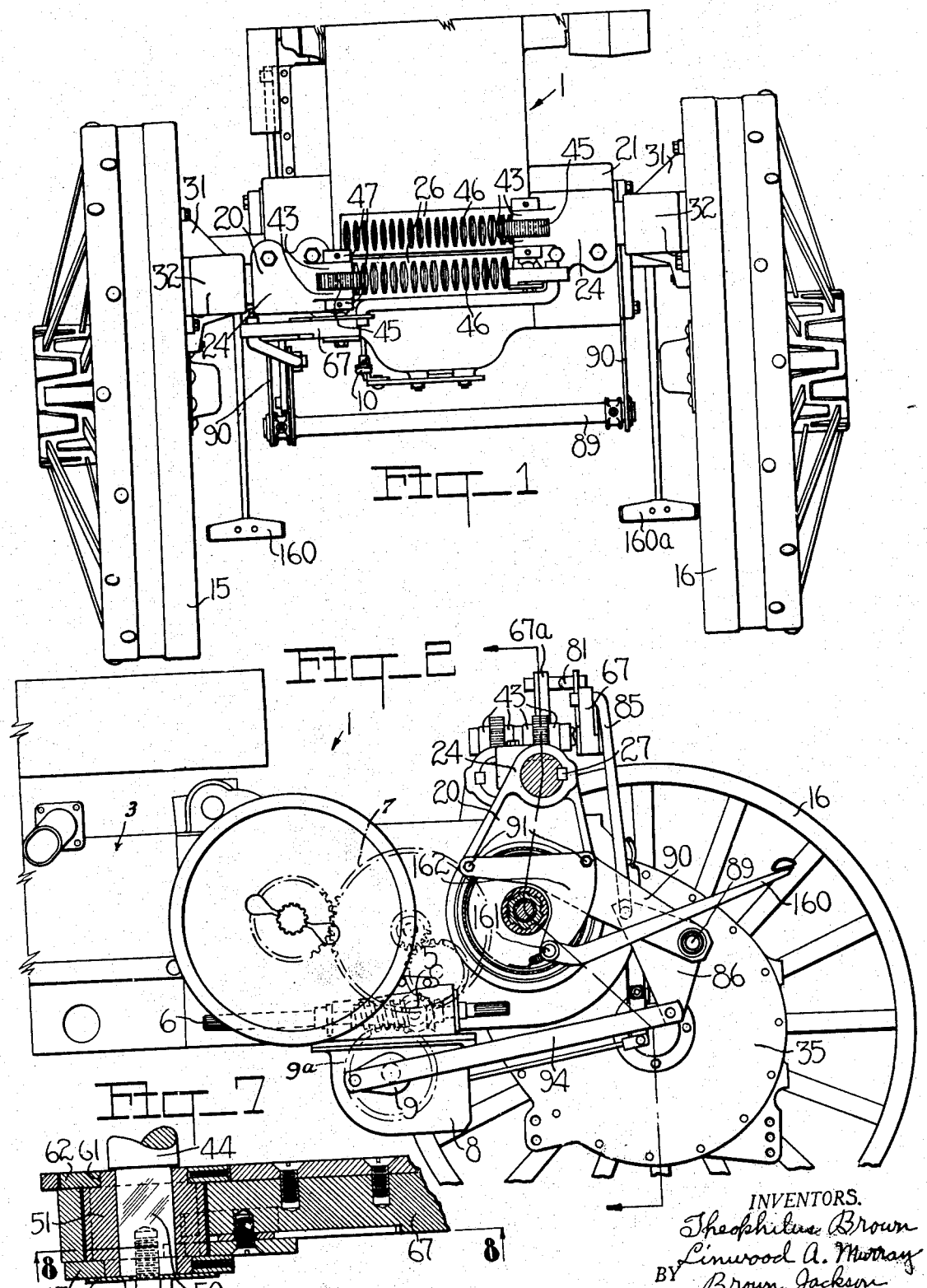
INVENTORS.
Theophilus Brown
Linwood A. Murray
BY Brown, Jackson
Boettcher & Diemer
ATTORNEYS.
WITNESS.
Edward Melin.

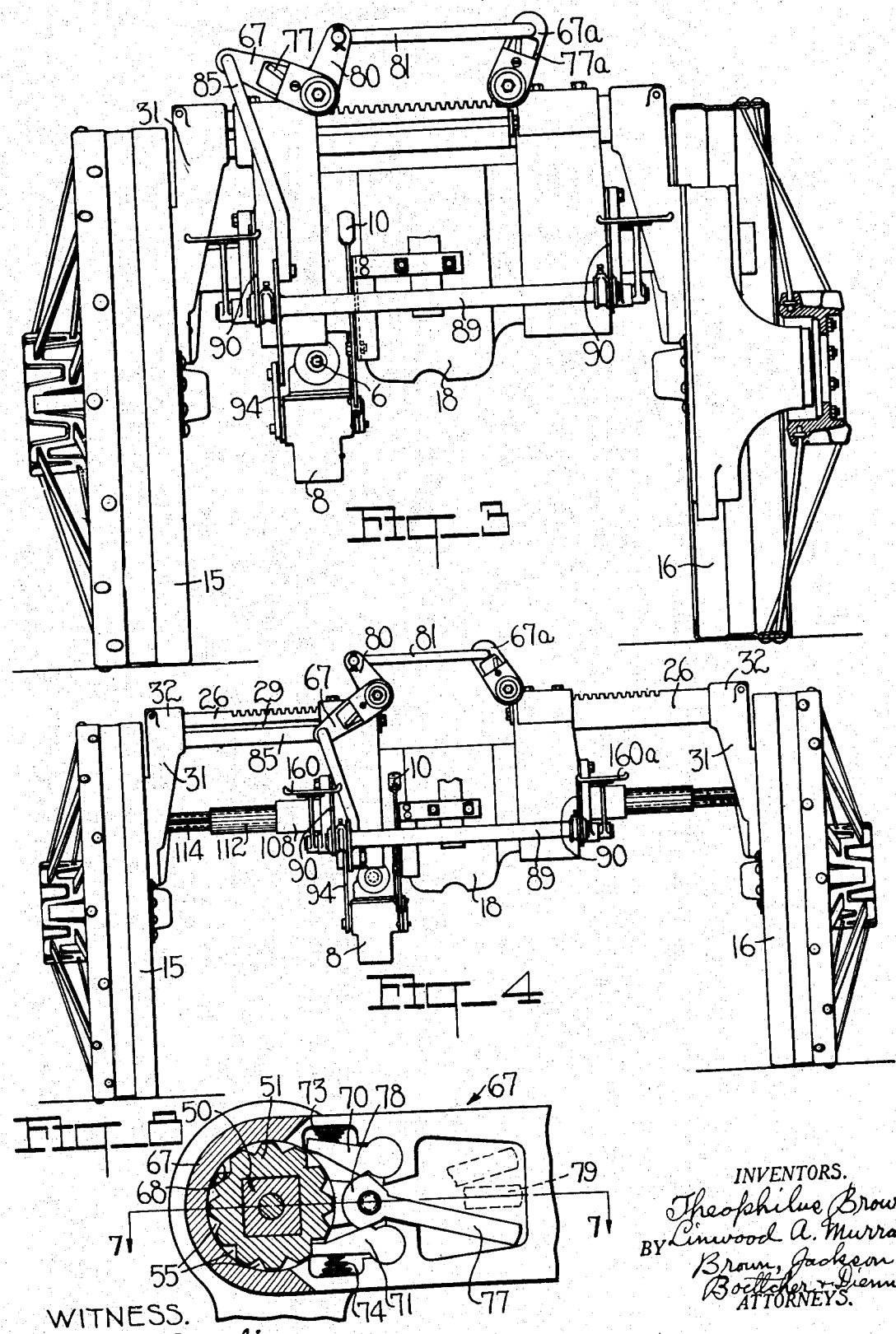

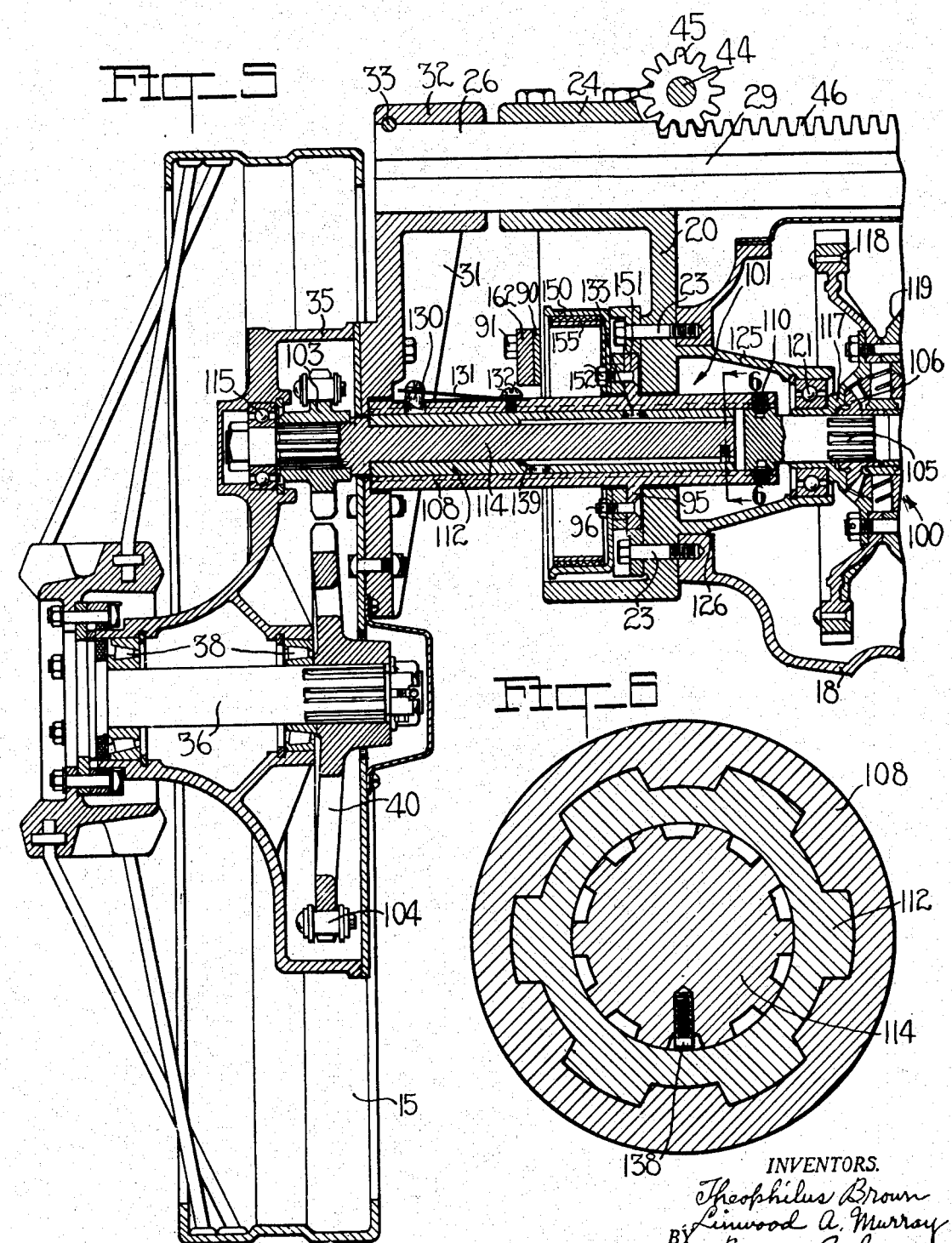

Patented May 21, 1935

2,002,002

UNITED STATES PATENT OFFICE 2,002,002

TRACTOR

Theophilus Brown and Linwood A. Murray, Moline, Ill., assignors to Deere & Company, Moline, Ill., a corporation of Illinois Application November 20, 1931, Serial No. 576,298

23 Claims. (Cl. 180—1)

The present invention relates generally to tractors and is more particularly concerned with an improvement in tractors whereby the tread of the drive wheels thereof can be varied by shifting the wheels inwardly or outwardly by means of power derived from the usual power lift on the tractor.

In tractors of the general purpose type, particularly those used for agricultural purposes, it is frequently quite desirable to be able to change the tread of the supporting wheels to accommodate the tractor to different row spacings and to different implements propelled or otherwise associated with the tractor.

The principal object of the present invention is to provide a construction wherein the supporting wheels or certain of them can be adjusted laterally of the tractor by power derived from the usual power lift. Generally, a substantial expenditure of power is necessary in order to shift the supporting wheels of the tractor to vary the tread, particularly when the tractor is standing still, and since tractors of the present day are usually equipped with some form of power lift in the nature of a half-revolution power lift crank or the equivalent, a simple and relatively inexpensive power actuated means for varying the spacing of the wheels can be provided by utilizing such power lift means.

Another object of the present invention is to provide such shiftable connections for varying the spacing of the supporting wheels that either of two supporting wheels may be separately moved, either inwardly or outwardly of the tractor, while the other wheel is moved either outwardly or inwardly or not at all.

It is also the object of the present invention to provide a construction wherein the shifting of the supporting wheels which requires the greatest expenditures of energy is accomplished in alternate step by step progression, that is, one wheel is moved a slight amount first, then the other wheel is moved a slight amount, then the first wheel is moved a slight additional amount, etc., all of this being performed by power derived from the tractor motor.

It is also an object of the present invention to provide an improved telescopic drive shaft construction for those of the supporting wheels which are the driving or traction wheels of the tractor.

Other objects and advantages of the present invention will be apparent to those skilled in the art after a consideration of the following detailed description of the preferred structural embodiments, which is by way of example only, taken in conjunction with the accompanying drawings illustrating such embodiment and in which:—

Figure 1 is a top plan view of the rear portion only of a tractor embodying a laterally shiftable supporting wheel construction;

Figure 2 is a side elevation of the portion of the tractor shown in Figure 1 with the near supporting wheel removed and certain parts shown in section;

Figure 3 is a vertical rear view of the tractor shown in Figure 1 and showing the two supporting wheels spaced relatively close together;

Figure 4 is a view similar to that shown in Figure 3 but on a somewhat reduced scale and showing the relative position of the shiftable supporting wheels in their wide spaced position;

Figure 5 is an enlarged sectional view taken on the line 5—5 of Figure 2 and showing the left hand supporting wheel only together with the mechanism associated therewith for shifting the same laterally of the tractor;

Figure 6 is an enlarged view taken along the line 6—6 of Figure 5;

Figure 7 is a fragmentary enlarged section taken along the line 7—7 of Figure 8 and showing certain details of the ratchet mechanism for controllably shifting one of the supporting wheels laterally of the tractor; and Figure 8 is a fragmentary view, partly in section and partly in elevation and taken along the line 8—8 of Figure 7.

Referring now to the drawings, the reference numeral 1 indicates in its entirety a tractor of the usual type having a generally longitudinal frame and a motor 3 mounted thereon or forming a part thereof. The tractor 1 includes a conventional form of power take-off 5 driven in any desired manner from the motor 3 and usually including a longitudinally extending power take-off shaft 6 (see Figure 2). Preferably, although not necessarily, the power take-off shaft 6 is driven from the motor 3 through a train of gearing indicated in its entirety by the reference numeral 7. A power lift means 8, also of conventional construction, is driven from the motor 3 or from the power take-off 5 and such a power lift usually embodies a half-revolution clutch disposed so as to operate a swinging power lift crank 9 through approximately 180° at each operation. Such power lift devices are well known and need not be described further here other than to note that such a power lift includes a gear 9a, driven by a suitable connection with the shaft 6, which is, in turn, driven by the aforesaid gearing 7 from the tractor motor 3. The power lift also includes a trip lever 10 which, when tripped by the operator, causes the half revolution clutch to engage and to swing the power lift crank 9 through one cycle of 180°. If the trip lever 10 is again operated the power lift crank 9 swings to another 180°, thus completing two cycles or 360° and arriving at its original position. Such power lift devices are usually arranged to lift or position implement tools or other operating parts carried by the agricultural machine associated with the tractor.

The tractor 1 also includes a pair of laterally spaced supporting wheels 15 and 16. In the construction illustrated these wheels are rear traction wheels, and the present invention contemplates connecting these wheels with the tractor frame so that the lateral spacing between the wheels, commonly termed the tread, can be adjusted. At the rear of the tractor frame 2 a differential housing 18 is provided, and to opposite sides of the housing 18 vertically disposed castings 20 and 21 are provided and which are rigidly connected therewith as by bolts 23. Each of the castings 20 and 21 is formed at its upper portion with a transversely extending sleeve 24. A rack member 26 is slidably mounted in each of the sleeves 24 and each rack is prevented from rotating in the associated sleeve by a key 27 fixed in the sleeve portion 24 and a cooperating keyway 29 provided in one side of the rack 26. Since these parts are substantial duplicates for the wheels at opposite sides of the tractor the illustration in Figure 5 serves for both of the supporting wheels shown.

Rigidly secured to the outer end of each of the rack members 26 is a vertically disposed casting 31 having at its upper end an apertured boss 32 receiving the outer end of the associated rack member and rigidly connected therewith by means of a pin 33 or the equivalent.

As best illustrated in Figure 5, a drive housing 35 is securely bolted to the lower portion of the depending casting 31, and this drive housing provides a journal support for the driving axle 36 upon which the traction wheel 15 is mounted. The drive axle 36 is rotatably supported upon the housing 35 by roller bearing means 38 of conventional construction. A driving gear or sprocket 40 is splined to the inner end of the driving axle 36 and serves as means for transmitting the drive to the traction wheel 15. The means for supporting the tractor on the other wheel 16 is substantially the same as just described, the only exception being that the sleeve member 24 on the left hand side of the tractor (see Figure 1) is disposed slightly in rear of the other sleeve member 24 on the right hand side of the machine. The purpose of this arrangement is to permit the two rack members to lie alongside one another when the wheels are spaced relatively close together.

The lateral spacing of the wheels 15 and 16 with respect to each other and to the body or frame of the tractor is controlled by the positions of the rack members 26 in the sleeve portions 24. For the purpose of shifting these rack members laterally of the tractor each sleeve 24 is provided with a pair of apertured ears 43 which act as bearings for a pinion shaft 44 upon which is secured a pinion 45 meshing with the teeth 46 formed on the rack member 26 (see Figures 1 and 5). Each sleeve 24 is thus provided with a pinion meshing with the associated rack member.

Each of the shafts 44 is provided with a pair of collars 47 for holding the shafts in position in the bearings 43.

The rear end of each shaft 44 is provided with a squared section 50 upon which a notched ratchet wheel 51 is fixed in non-rotatable relation. The squared section 50 is somewhat reduced as compared to the diameter of the shaft 44 and the ratchet wheel 51 is preferably held on the shaft 44 by means of a washer 53 and a cap screw 54 (see Figure 7). The notches in the ratchet wheel 51 are designated by the reference numeral 55 in Figure 8. Each of the shafts 44 is provided with such a ratchet member, and each ratchet member 51 is formed with reduced end portions 60 and 61 (see Figure 7) to receive collars 62 and 63 which encircle the reduced ends and embrace the ratchet member 51.

In order to spread the wheels 15 and 16 or bring them closer together, means are provided for rotating the ratchet members 51 either in one direction or the other or either alternately or concurrently. The collars 62 and 63 for each of the ratchet members 51 are on opposite sides of an actuating arm 67 having a cylindrical recess 68 receiving the ratchet member 51. Each actuating arm 67 is provided with suitable recesses communicating with the cylindrical recess 68 and providing for the disposition of a pair of pawls 70 and 71 pivotally supported by the arm 67 and resiliently pressed, as by springs 73 and 74, into engagement with the teeth formed on the ratchet member 51.

The pawls 70 and 71 are alternatively actuable at the control of the operator, and to this end the actuating arm 67 carries a cam lever 77 pivotally mounted thereto between the pawls 70 and 71, as best shown in Figure 8.

The cam end 78 of the lever 77 and the cooperating portions of the pawls 70 and 71 are so formed that in one position, that shown in full lines in Figure 8, the pawl 71 is permitted to be forced into operative engagement with the ratchet 51 by the spring 74 while the other pawl 70 is forcibly held out of engagement with the ratchet 51 and against the force of the spring 73 by the lever 77, whereupon oscillation of the arm 67 will cause the ratchet 51 and shaft 50 to rotate in a clockwise direction as viewed in Figure 3 in step by step progression. In the opposite position the pawl 70 is permitted to engage with the ratchet 51 while the other pawl 71 is held away from the ratchet 51. With the lever 77 in this position oscillation of the arm 67 will rotate the shaft 50 in a counterclockwise direction. In the neutral position, that indicated at 79, the lever 77 is operative to hold both of the pawls 70 and 71 away from the ratchet 51, thus preventing any turning movement from being applied to the pinion 45 associated therewith. Thus, the cam lever 77 for each of the arms 67 and 67a may be moved to either of three positions independently of the setting of the other lever 77.

The arm 67 has fixed thereto a second arm 80 which is connected by means of a link 81 to an actuating arm 67a which is identical for all practical purposes with the arm 67 described above. The arm 67a is operatively associated with the pinion 45 at the right hand side of the machine and serves to actuate the same in exactly the same manner as the actuating arm 67 drives the pinion 45 at the left hand side of the machine by the intervention of the ratchet mechanism 51, 70 and 71.

As will be clear from the above description, whenever the actuating arms 67 and 67a are oscillated back and forth an intermittent step by step rotation is imparted to the pinions 45 which, in turn, shifts the racks 26 through the sleeves 24, thus shifting the wheels 15 and 16 bodily laterally. This, if it is to be done in a comparatively short time, calls for a considerable expenditure of power, and one of the principal features of the present invention is the feature of actuating the pinions 45 from the usual or conventional power lift mechanism 8 of the tractor. Referring now more particularly to Figures 3 and 4, it will be observed that the actuating arm 67 at the left hand side of the machine is somewhat longer than the corresponding arm 67a on the right hand side of the machine. This construction provides for the pivotal connection with the arm 67 of a link 85 at its upper end, the lower end of the link 85 being pivotally connected with a bell crank 86 fixed to a shaft 89 journaled in suitable perforations in a pair of brackets 90. The latter are rigidly secured to the castings 20 and 21 by bolts 91. The lower of the bell crank 86 is connected by means of a power transmitting link 94 with the swinging crank 9 of the power lift 8.

The operation of the device so far described is substantially as follows: By holding the trip lever 10 down to cause the continuous operation of the power lift mechanism 8, whereby the power lift crank 9 is given a continuous rotation, the arms 67 and 67a will be oscillated back and forth laterally of the tractor through the links 85 and 94 and the bell crank 86. Thus, depending on the setting of the levers 77 and 77a, the oscillatory movement of the arms 67 and 67a will be transmitted to cause the two pinions 45 to be rotated, either in one direction or the other. Since the levers 77 and 77a may be separately adjusted in either of the three positions permitted, the traction wheels 15 and 16 may be moved apart or toward one another, or either may be shifted toward the tractor while the other is shifted away from the tractor. The actuating arms 67 and 67a, together with the associated pawls, are preferably so arranged that when the wheels are moved either toward or away from the tractor, that is, both wheels inwardly or both wheels outwardly, one wheel will be moved during one stroke of the link 94 while the other will be moved on the other stroke, thereby distributing the load more evenly on the power lift mechanism. In other words when the supporting wheels are both shifted inwardly or both shifted outwardly such shifting motion is secured in an alternate step by step progression.

For example, with the lever 77 in the position shown in Figure 3, the wheel 15 will be moved outwardly when the link 85 is raised and, at the same time, with the lever 77a in the position shown in Figure 3, the right wheel 16 will not be moved. However, on the subsequent downward movement of the link 85, the arm 67a will be swung toward the left, and this movement will shift the right wheel 16 outwardly, while the left wheel 15 will not be moved. Thus, when both wheels are to be moved outwardly of the tractor, or both inwardly, only one wheel is shifted at a time.

On the other hand, if one wheel is to be shifted outwardly while the other is to be shifted inwardly, either the lever 77 or the lever 77a, depending on which wheel is to be shifted inwardly, is moved to its other position at the opposite side of the recess in the associated arm, 67 or 67a, and in this case both of the rear wheels 15 and 16 will be shifted on the same stroke of the crank arm 94 and the link 85. For example, if the lever 77 is shifted to a position opposite that shown in Figure 3, on the downstroke of the link 85 the wheel 15 will be shifted inwardly and the wheel 16 will be shifted outwardly, but on the upstroke, neither of the wheels will be shifted. However, if the lever 77a is shifted to its opposite position and the lever 77 left in the position shown in Figure 3, neither of the wheels will be shifted on the downstroke of the link 85, but both will be shifted, wheel 15 outwardly and wheel 16 inwardly, on the upstroke.

On the other hand, if one of the levers 77 is set for outward movement of the associated supporting wheel while the other lever is set for inward movement of its supporting wheel, power will be supplied to the two pinions 45 on the same stroke of the link 94. Moving one wheel outwardly and the other inwardly does not, however, call for the expenditure of any great amount of power since all that is done is merely to move the body of the tractor away from one wheel and closer to the other without moving the two wheels on the ground. This, of course, requires very little power as compared to the power required to slide the wheels 15 and 16 on the ground. When the tractor is standing on a relatively smooth supporting surface, such as a concrete floor or the like, the tread may be changed while the tractor is stationary, but if the tractor is on soft earth as in the field, it is preferable that the tractor should be advanced forwardly as the supporting wheels are adjusted in order to relieve the power lift mechanism of the relatively great side thrust offered by the soil to the lateral movement of the wheels.

The supporting wheels 15 and 16 and the tread changing means therefor as described above may be either front or rear wheels as far as the shifting means are concerned. As illustrated, however, the wheels 15 and 16 are rear traction wheels and the driving means therefor, so constructed and arranged to transmit the driving torque irrespective of the tread adjustment, will now be described.

The traction wheels 15 and 16 are driven from a differential 100 of conventional construction. The power for the wheel 15 is taken from the differential 100 through a telescoping drive shaft 101, journaled in the castings 20 and 35, to a driving pinion 103 mounted within the drive housing 35 connected as by a driving chain 104 with the driving sprocket 40 secured to the driving axle 36. The telescoping drive shaft 101 comprises a splined stub shaft 105 having its inner end in operative driving engagement with the splined hub of one of the bevel differential gears 106. A tubular internally splined shaft 108 is secured at its inner end to the outer end of the stub shaft 105, as by screws 110, and slidably mounted within the tubular shaft 108 is a sleeve 112 having external splines received between the internal splines of the tubular shaft 108, see Figure 6. As best illustrated in Figure 5 the inner portion of the sleeve 112 is provided with a smooth cylindrical interior while the outer end of the sleeve is provided with interior splines engaging between exterior splines formed on the inner shaft 114. The outer end of the shaft 114 is splined to receive the driving pinion 103 and is provided with conventional antifriction bearing means 115 journaling the outer end of the shaft 114 in the drive housing 35. At the other end of the telescoping shaft 101 the stub shaft 105 is received within and extends through a boring in a plate member 117 bolted to the driving gears 118 and 119 of the differential 100. The plate member 117 supports the inner race of the antifriction means 121, the outer race of which is supported in the end of a sleeve 125 formed on the casting 120 and which fits into an opening 126 in the differential housing 18.

In order to provide means for limiting the lateral movement of the wheel 15 and the amount of permissible separation of the castings 20 and 31, the tubular shaft 108 is provided with an aperture near its laterally outer end which receives a plunger 130 carried by a spring 131 secured as by a screw 132 to the shaft 108. The laterally inner end of the sleeve 112 is provided with an opening 133 so dimensioned to receive the plunger 130 in the outer position of the sleeve 112. In this way the sleeve 112 is prevented from being shifted entirely out of engagement within the tubular shaft 108.

The inner shaft 114 carries near its laterally inner end a small set screw 138, see Figure 6, which will strike the end wall 139 of the associated spline formed interiorly in the outer portion of the sleeve 112. In this way the laterally extended position of the sleeve 112 and the shaft 114 is limited.

It will thus be seen that driving torque will be transmitted from the differential 100 to the driving wheel 15 irrespective of the lateral shifted movement of the latter. The drive to the other traction wheel 16 is substantially the same as just described and no further description thereof is necessary.

For the purpose of steering the tractor and otherwise controlling the same, brakes are usually associated with the traction wheels. Preferably, a brake is provided for each of the wheels and is generally applicable independently of the brake for the other wheels. Referring now to Figure 5 which shows the brake associated with the left hand traction wheel 15, the brake drum 150 is housed within the casting 20 and is bolted to a flange 151 formed on the tubular shaft 108 by means of bolts 152. Preferably, the flange 151 is formed integrally with the tubular shaft 108 although it may be separately formed and secured thereto in any manner desired. An internally expanding brake shoe 155 is operatively associated with the brake drum 150. The brake 155 is expanded to brake the wheel 15 by means of a foot pedal 160 pivotally mounted, as at 161, on a supporting member 162 bolted to the casting 20 by the same bolts 91 which secure the bracket 90 in position. By thus disposing the brake in operative association with the tubular shaft 108, which forms a part of the telescoping drive shaft 101, the brake when applied is equally effective irrespective of the lateral position of the wheel 15. The opposite traction wheel 16 is provided with the same brake construction operated by a companion brake pedal 160a so that a further description of the braking means for the traction wheel 16 is not necessary.

While we have shown and described in detail the preferred structural embodiment of the present invention, it will be apparent to those skilled in the art that our invention is not to be limited to the specific means shown and described, but that, in fact, widely different means may be employed in the practice of the broader aspects of our invention as defined by the appended claims.

What we claim, therefore, and desire to secure by Letters Patent is:

1. In a tractor having a power lift including an oscillatory member, the combination of a laterally shiftable supporting wheel, reversible ratchet means for shifting said wheel in either direction at will, and means connecting said ratchet means and said oscillatory member for transmitting the movements of said member to said ratchet means to actuate the latter.

2. In combination, a tractor having a motor, two laterally spaced supporting wheels for the tractor, a power lift on the tractor operable from the motor of the tractor, and a reversible means associated with each supporting wheel, said two reversible means being driven from the power lift of the tractor and operable together for shifting the supporting wheels in either direction at will, said two reversible means being separately operable to shift either of said wheels inwardly and outwardly, independently of the other wheel.

3. In combination, a tractor having a motor, two laterally spaced supporting wheels for the tractor, a power lift on the tractor operable from the motor of the tractor, separate shifting means for each wheel driven from said power lift for shifting the wheel laterally, and reversing means associated with each shifting means for reversing the direction of operation of the latter.

4. In a tractor, the combination of spaced supporting wheels, means movably mounting the tractor on said wheels, and interconnected means for shifting the wheels laterally relative to the tractor in alternate step by step progression.

5. In a tractor having a power lift, the combination of a frame, laterally spaced supporting wheels for said frame, means shiftably mounting said wheels for lateral movement relative to said frame, interconnected mechanism including reversible individual means for shifting each of said wheels laterally of the frame, and means connecting said mechanism with the power lift to drive said reversible individual means thereby.

6. In a tractor having a power lift clutch of the half revolution type and a power lift crank actuated thereby, the combination of laterally spaced supporting wheels, means movably supporting the tractor on said wheels, separate means for shifting each of said wheels, and means operated by movement of said power lift crank in one direction for shifting one of said wheels and operable when the power lift crank moves in the other direction to shift the other of said supporting wheels.

7. In a tractor, the combination of supporting wheels for the tractor, non-rotatable shiftable means movably mounting the supporting wheels on said tractor to vary the relative position of the wheels, and means separate from said shiftable means for rotating certain of said wheels comprising a telescopic member adapted to accommodate variations in the positions of the wheels.

8. In a tractor having a motor, the combination of laterally spaced traction wheels, nonrotatable supporting means mounting the traction wheels on said tractor for relative bodily movement, and means spaced from said first means and operated by said motor for rotating said wheels including a pair of telescopic drive shafts.

9. In a tractor having a frame, the combination of a pair of laterally spaced supporting wheels, means shiftable with respect to the frame for supporting the latter on said wheels, a pair of sleeves secured to said frame and rotatable with respect thereto, a member laterally slidable in each of said sleeves, driving means connecting said members with said wheels, and power operated means for shifting said shiftable means laterally to vary the tread of said supporting wheels.

10. In a tractor having a motor, the combination of a frame, sleeve means carried by said frame, a pair of laterally shiftable driving members movably mounted in said sleeve means and shiftable inwardly and outwardly laterally of the frame, a pair of spaced traction wheels, means connecting said traction wheels with the outer ends of said members, means shiftable with respect to said frame for supporting the latter on said wheels, means for shifting said shiftable means laterally of the tractor by the power of the motor for varying the tread of said wheels, and means including said members and sleeve means for driving said traction wheels from said motor.

11. In a tractor having a motor and a frame, the combination of a pair of sleeve members secured to opposite sides of the frame, a rack laterally shiftable in each of said sleeve members, a downwardly depending member rigidly secured to the outer end of each of said racks, a pair of traction wheels, means mounting said wheels for rotation at the lower ends of said downwardly extending members, means including a power driven pinion for each of said racks to shift said wheels laterally to vary the spacing thereof, and means including a power driven telescopic drive shaft mounted for rotation in said sleeve member and said downwardly extending member for driving each of said traction wheels.

12. In a tractor having a frame and a power lift, the combination of a pair of sleeve members secured to the frame, a laterally movable rack slidably mounted within each of said sleeve members, a downwardly depending casting rigidly secured to the laterally outer end of each of said racks, supporting wheels journaled on said downwardly depending castings, a pinion journaled in each of said sleeve members and operatively meshed with the associated rack, ratchet means for driving each of said pinions, and means actuated by said power lift for operating the ratchet means to shift said wheels laterally of the tractor to vary the spacing thereof.

13. In a tractor having a frame and a power lift, the combination of a pair of sleeve members carried by said frame, laterally shiftable racks slidably mounted in said frame members and adapted to be shifted inwardly and outwardly of the tractor, supporting wheels carried by the outer ends of said racks, pinions carried by said sleeve members, one for each rack, ratchet mechanism for optionally rotating each of said racks in either direction, means connecting said ratchet mechanisms to swing together, and oscillatable means actuated by said power lift for swinging said ratchet mechanisms to bodily shift said supporting wheels.

14. In a tractor having a motor, the combination of a frame, vertically disposed members secured to the frame on opposite sides thereof, each of said members having an upwardly disposed horizontal sleeve portion, a pair of laterally slidable racks mounted in non-rotatable relation within said sleeve portions, said last named portions being slightly offset with respect to one another so that said racks may lie alongside one another, supporting wheels carried at the outer ends of said slidable racks, pinion means journaled in each of said sleeve portions and cooperating with the corresponding rack to move the same laterally relative to the tractor, and means operated by the power of said motor for controllably rotating said pinions to shift said wheels.

15. In a tractor, the combination of spaced supporting wheels, means movably mounting the tractor on said wheels, whereby the latter are shiftable laterally with respect to the tractor, and reversible means driven from the power of the tractor and actuable in one direction for shifting one of the wheels with respect to the tractor and actuable in the other direction for shifting the other wheel with respect to the tractor in alternate step by step progression.

16. In a tractor, the combination of spaced supporting wheels, means movably mounting the tractor on said wheels, whereby the latter are shiftable laterally with respect to the tractor, and means actuated by the power of the tractor and including interconnected ratchet mechanism having means actuable in one direction for shifting one of the wheels outwardly of the tractor and having means actuable in the other direction for shifting the other wheel outwardly of the tractor.

17. In a tractor, the combination of spaced supporting wheels, a pair of transverse bars movably mounted on the tractor, means supporting the outer ends of said bars on said supporting wheels, said bars being shiftable laterally of the tractor to vary the tread of said wheels, interconnected mechanism associated with said bars for shifting the latter, and control means for causing said mechanism to shift either of the wheels inwardly or outwardly and to shift one wheel outwardly of the tractor and the other wheel inwardly thereof.

18. In a tractor, the combination of spaced supporting wheels, a pair of transverse bars movably mounted on the tractor, means supporting the outer ends of said bars on said supporting wheels, said bars being shiftable laterally of the tractor to vary the tread on said wheels, interconnected mechanism associated with said bars for shifting them, optionally operable control means to cause said mechanism to shift either the wheels inwardly or outwardly and to shift one wheel outwardly of the tractor and the other wheel inwardly thereof, and means actuating said interconnected mechanism from a single source of power on the tractor.

19. In combination, a tractor having a motor, a laterally shiftable supporting wheel for the tractor, a reciprocating member, means for reciprocating said member from power derived from the motor of the tractor, and reversible ratchet means actuated by the successive movements of said reciprocating member in one direction for shifting said supporting wheel.

20. In a tractor, a pair of laterally shiftable supporting wheels, a reciprocating member, means actuated by the successive movements of said reciprocating member in one direction for shifting one of the wheels, and means actuated by the successive movements of said reciprocating member in the other direction for shifting the other of said wheels.

21. In a tractor, a pair of laterally shiftable supporting wheels, a reciprocable member, means actuated by successive movements of said reciprocable member in one direction for shifting one of said wheels in one direction relative to the tractor, and means operative by successive movements of said reciprocable member in the other direction for shifting the other of said wheels in the same direction relative to the tractor.

22. In a tractor, a pair of laterally shiftable supporting wheels, a reciprocable member, means actuated by the successive movements of said reciprocable member in one direction for shifting one of said wheels laterally inwardly of the tractor, and means actuated by the same movements of said reciprocable member for shifting the other of said wheels laterally outwardly of the tractor.

23. In a tractor, a pair of laterally spaced supporting wheels, mounting means shiftable with respect to the tractor and disposed between the tractor and said wheels, bracket means at the ends of said mounting means to receive said wheels for supporting the tractor thereon, a pair of rotatable driving members carried by the tractor below said mounting means and operatively driven thereby, brake means carried by the tractor and operatively associated with said members to control the rotation thereof, and laterally shiftable means journaled at their outer ends in said bracket means and connecting each of said rotatable driving members with the associated supporting wheel for driving the latter therefrom.

THEOPHILUS BROWN.
LINWOOD A. MURRAY.